Jan. 18, 1927.
J. H. SHAW
1,614,998
GEAR SHIFT ROD LOCK
Filed May 13, 1920
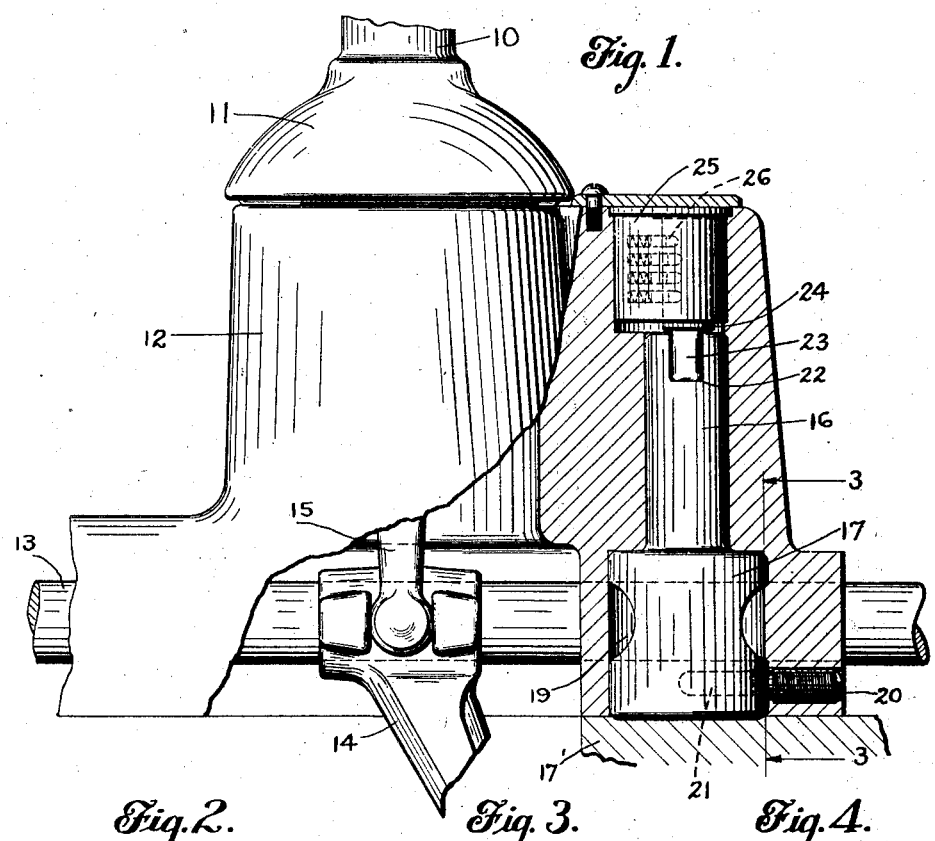
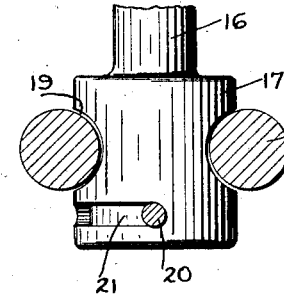
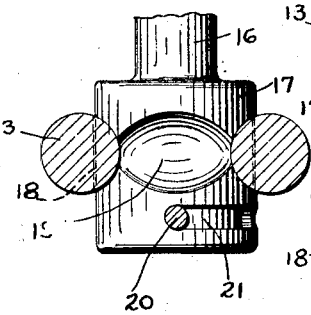
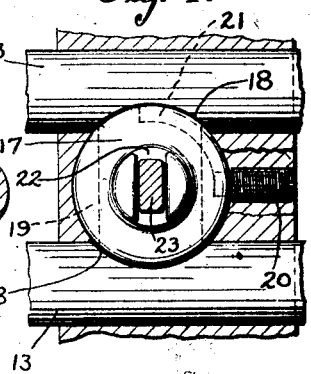
Inventor
John H. Shaw
By Henry E. Rockwell
Attorney Patented Jan. 18, 1927.

1,614,998

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

GEAR-SHIFT-ROD LOCK.

Application filed May 13, 1920. Serial No. 381,145.

This invention relates to a locking mechanism for a gear shifting device and more particularly to a locking means for that type of gear shift which employs shifter rods on which the shifting yokes are mounted.

One object of the invention is to provide a locking device which when in locked position will prevent the gear shifting mechanism from being operated and which may not be moved to unlocked position by an unauthorized person.

A second object of the invention is to provide a means for the purpose specified which is of a simple character, having few parts to get out of order and one which is easy and simple of operation.

A further object of the invention is to provide a locking means of the character described which will, when in unlocked position, interfere in no way with the normal use of the shifting devices.

While in the accompanying drawing I have illustrated one form of the invention as applied to the gear shifting mechanism of an automobile, it is to be understood that the use of the device is not so restricted and may be used in many other relations where it is desired to lock movable parts against movement from a given position.

In the drawings:

Figure 1 is an elevational view, partly in section, of a gear shifting mechanism embodying my invention.

Figure 2 is a detail sectional view showing the shifter rods and locking bolt in unlocked position.

Figure 3 is a view similar to Figure 2 showing the parts in locked position.

Figure 4 is a detail plan view of the locking bolt and shifter rods when the parts are in locked position.

With reference to the drawings I have shown at 10 a gear shift lever of a type commonly employed on motor vehicles having variable speed mechanism. As is customary, the lever 10 is fulcrumed for universal movement at 11, in the upper part of the gear case or casting 12. This lever may be connected with the gear shifting mechanism in any desired manner. I have shown one form of such connection which comprises two shifter rods 13, slidably mounted in the casting 12, each having a shifting yoke 14 fixed thereon. The lower end 15 of the lever 10 extends downwardly to a point between these two yokes from which position it may be thrown, by the shifting of the upper portion of the lever, into operative engagement with the yokes and the shifter rods. By this means the rods 13, and the shifting yokes 14 rigidly mounted thereon are moved to shift the gears. The structure previously described is old in the art and may be of any common or known form, the one shown merely being illustrative of one use of my improved locking means.

In the casting 12, I have rotatably mounted a vertical rod 16, the lower end of which is enlarged in cylindrical form as at 17 so that its diameter is greater than the distance between the shifter rods 13, and lies between and in the same horizontal plane with these rods. In the form shown this rod 16, is near the end of the rods 13, but the exact location is of no importance. Opposite the enlarged portion 17 of the rod 16, the shifter rods 13 are recessed at 18, the recesses facing this enlargement, and being of such a depth, that the distance from the deepest portion of one recess to the deepest portion of the other is only slightly greater than the diameter of the enlarged portion 17. These recesses are so positioned that they lie opposite each other with the enlargement 17 between them when the lever 10 and the vehicle gears are in neutral position, as shown in the drawings.

The enlarged end 17, of the rod 16, is recessed at diametrically opposite points as shown at 19, to such a depth that the distance between their deepest portions is less than the distance between the shifter rods 13. It is apparent that when the rod 16 is turned so that the recesses 19, face the shifter rods, these rods will be accommodated in the recesses (Fig. 2) and will slide freely therethrough to shift the vehicle gears in the usual manner. When, however, the rod 16 is given a quarter turn with the shifter rods in neutral position the enlargement 17 will enter the recesses 18 and effectually lock the shifter rods against movement, and lock the vehicle gears from being moved out of neutral position as shown in Figures 3 and 4.

A screw 20 extending through the casting and into a slot 21 in the enlarged end 17, of the rod 16, limits the rotative movement of this rod to one quarter turn, by its engagement with the end walls of the slot. This screw also serves to support the rod 16, though this rod may also rest upon a portion of the gear case 17'.

The upper end of the rod 16 is provided with a slot or key way 22, into which snugly fits a key or lug 23 on the key barrel 24 of a cylinder lock, the case 25 of which is mounted in the top of the casting 12 so that the key barrel will lie in vertical alignment with the rod 16. The lock may be of any suitable type, but, I have preferred to show an ordinary form of pin tumbler lock provided with the pin tumbler extension, 26 extending into the case 25.

It is apparent that if a key is inserted in the key barrel of the lock when the parts are in the position in Fig. 2 and given a quarter turn (which will be determined by the screw 20 and slot 21) the rod 16 will then be turned to the position shown in Fig. 3, where the enlarged cylinder 17, by engaging in the recesses 18 of the shifter rods 13 will securely lock these rods against movement. The parts must then be unlocked by a reverse rotation of the rod 16, which may only be accomplished with the proper key.

By connecting the key barrel directly to the rod 16 to operate the same I have provided an extremely simple device both in operation and method of manufacture.

Having thus described my invention, what I claim as new and desire to protect by Letters Patent is:

1. A gear shift lock mechanism comprising a longitudinally movable shifter rod, provided with a recess, a rotatable rod mounted adjacent thereto and provided with means to lockingly engage said recess in certain positions of said last named rod, key operated means to move said rod to locking position including a key barrel having a tongue and slot connection with the rod, said rotatable rod being cut away to provide clearance for said shiftable rod, and being provided with a slot below said cut away portion, and a member secured at right angles to said rotatable rod and projecting into said slot to support said rod and to limit the rotatable movement thereof.

2. A gear shift lock mechanism comprising a longitudinally movable shifter rod, provided with a recess, a rotatable rod mounted adjacent thereto, key operated means to control said rod, including a key barrel having a tongue and slot connection therewith, said rod being provided with an enlarged lower end adapted to enter said recess to prevent movement of the shifter rod, said enlarged end of the rotatable rod being provided with a recess to clear the shifter rod and permit movements thereof, and being provided with a slot below said recess and a member disposed at right angles to said rotatable rod, and having a part entering said slot to support said rod and limit the rotatable movement thereof.

3. A gear shift lock mechanism comprising a longitudinally movable shifter rod provided with a recess, a rotatable rod mounted adjacent thereto, key operated means to control said rod including a key barrel having a tongue and slot connection therewith, said rod being provided with an enlarged lower end adapted to enter said recess to prevent movement of the shifter rod, said enlarged end of the rotatable rod being provided with a recess to clear the shifter rod and permit movements thereof, and being provided with a quadrantal slot below said recess, and a member disposed at right angles to said rotatable rod and having a part entering said quadrantal slot to support said rod and limit the rotatable movement thereof to a quarter turn.

In witness whereof, I have hereunto set my hand on this 10th day of May, 1920.

JOHN H. SHAW.